(12) United States Patent
Kim

(10) Patent No.: US 12,050,277 B2
(45) Date of Patent: Jul. 30, 2024

(54) TRACKING DEVICE CAPABLE OF CHANGING TRACKING METHOD IN THREE TYPES

(71) Applicant: SL LAB, INC., Seoul (KR)

(72) Inventor: Jeong Hyun Kim, Seoul (KR)

(73) Assignee: SL LAB, INC., Seoul (KR)

( * ) Notice: Subject to any disclaimer, the term of this patent is extended or adjusted under 35 U.S.C. 154(b) by 233 days.

(21) Appl. No.: 17/908,892

(22) PCT Filed: Jan. 27, 2022

(86) PCT No.: PCT/KR2022/001537
§ 371 (c)(1),
(2) Date: Sep. 1, 2022

(87) PCT Pub. No.: WO2022/164245
PCT Pub. Date: Aug. 4, 2022

(65) Prior Publication Data
US 2023/0092058 A1    Mar. 23, 2023

(30) Foreign Application Priority Data

Jan. 27, 2021 (KR) .................... 10-2021-0011434

(51) Int. Cl.
*G01S 3/786* (2006.01)
*G02B 23/16* (2006.01)

(52) U.S. Cl.
CPC ............. *G01S 3/786* (2013.01); *G02B 23/16* (2013.01)

(58) Field of Classification Search
CPC ....... G01S 3/786; G01S 3/7867; G02B 23/16; G02B 23/165
See application file for complete search history.

(56) References Cited

U.S. PATENT DOCUMENTS

| 3,464,116 A | 9/1969 | Kissell | |
|---|---|---|---|
| 6,369,942 B1 * | 4/2002 | Hedrick | G02B 23/16 |
| | | | 359/809 |
| 6,519,084 B1 * | 2/2003 | Kawasaki | H01Q 1/125 |
| | | | 359/849 |
| 2008/0062515 A1 | 3/2008 | Aniol et al. | |
| 2008/0165076 A1 | 7/2008 | Pan | |

FOREIGN PATENT DOCUMENTS

| JP | 02-137108 U | 11/1990 |
|---|---|---|
| KR | 10-2013-0054021 A | 5/2013 |
| KR | 10-2085594 B1 | 3/2020 |

OTHER PUBLICATIONS

International Search Report for PCT/KR2022/001537 mailed May 4, 2022 from Korean Intellectual Property Office.

\* cited by examiner

*Primary Examiner* — Courtney D Thomas
(74) *Attorney, Agent, or Firm* — Revolution IP, PLLC

(57) ABSTRACT

The present invention relates to a tracking device for tracking and observing or communicating with moving objects in space or in the atmosphere, wherein the present invention is devised to satisfy the aforementioned needs and an object of the present invention is to provide a tracking device of enabling a single mount to change a posture by one of an altitude-azimuth (ALT-AZ) control method, an equatorial control method, and an altitude-altitude (ALT-ALT) control method so as to facilitate the best tracking according to the operation characteristics of a moving object on the celestial sphere by variously controlling an installation angle of a main rotation shaft.

6 Claims, 7 Drawing Sheets

[Figure 1]
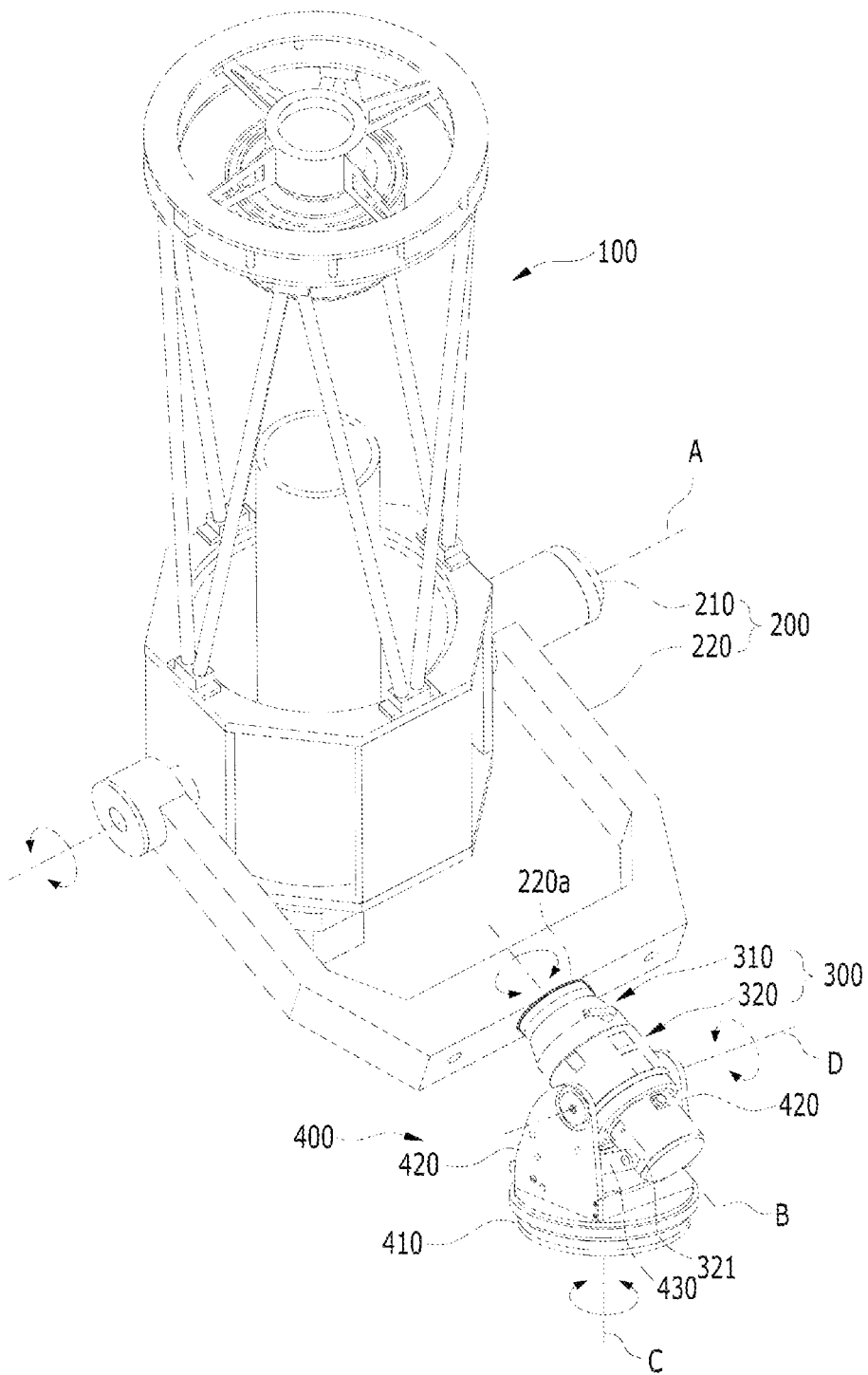

[Figure 2]
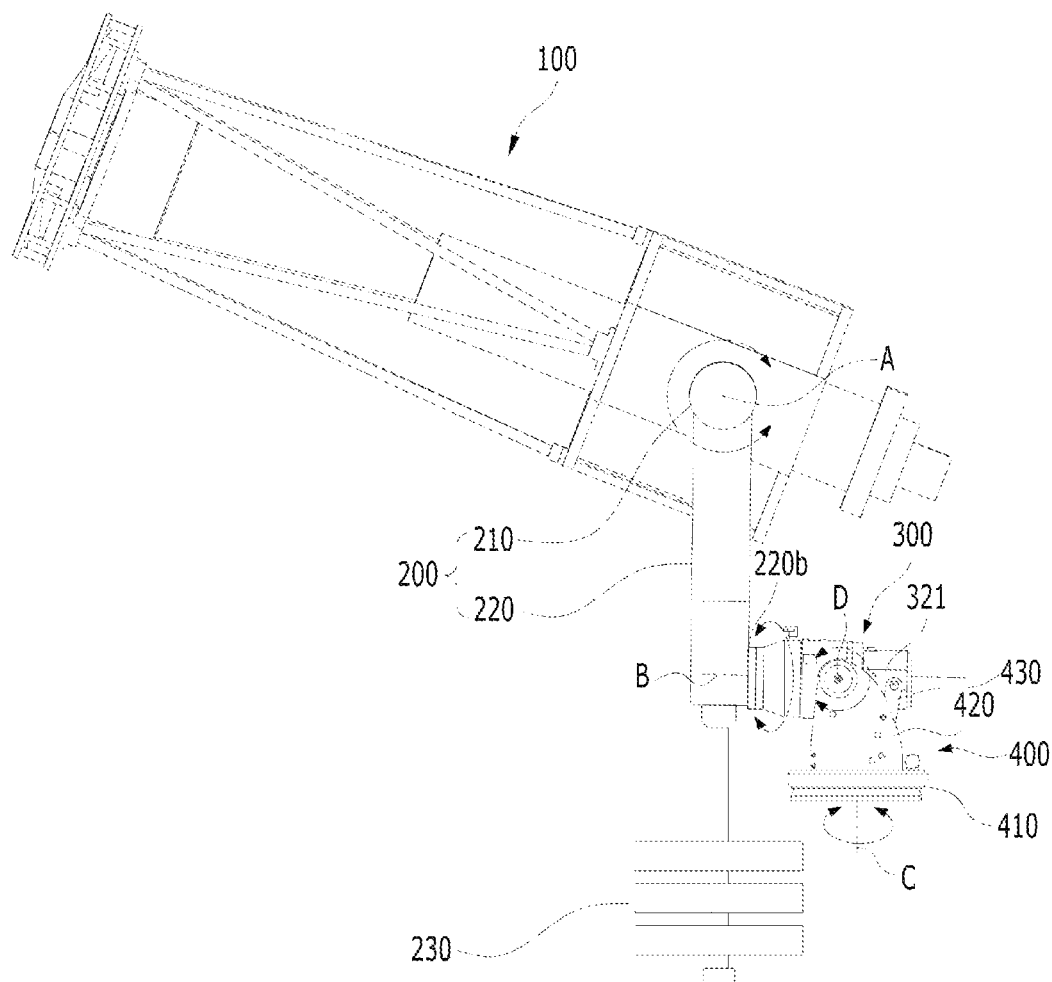

【Figure 3】
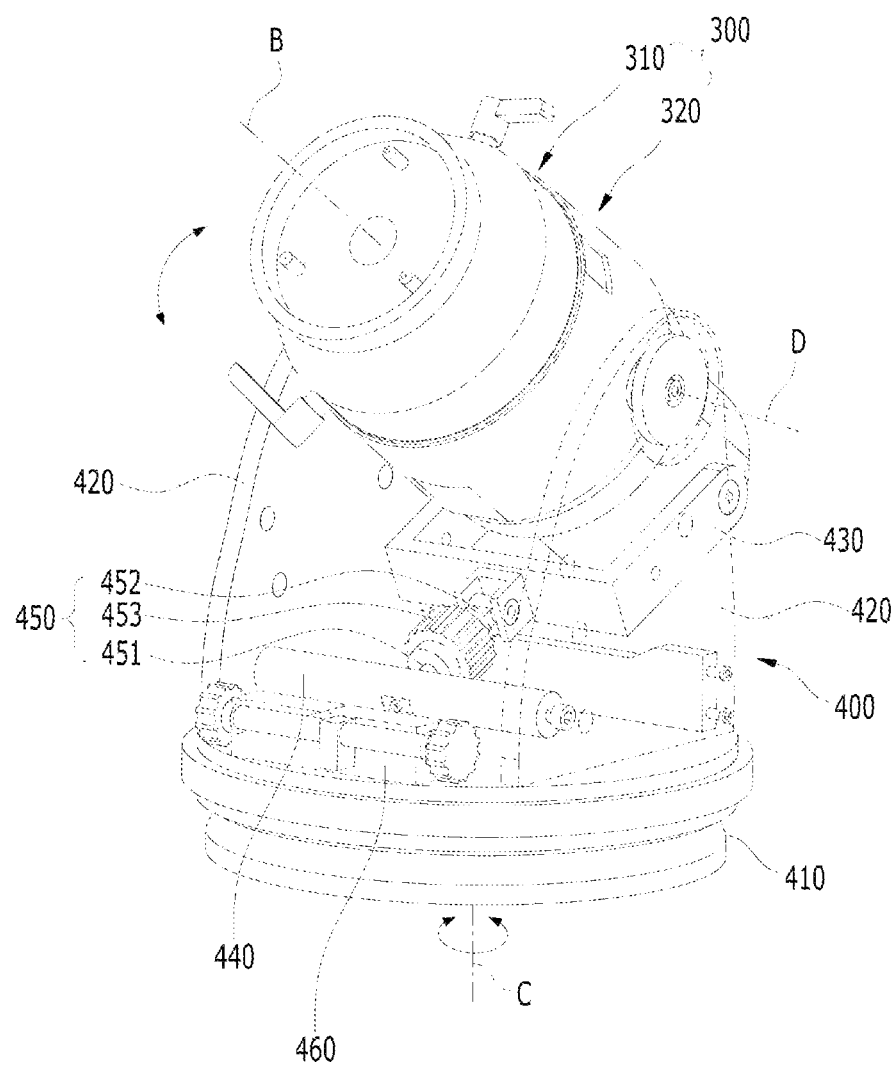

【Figure 4】
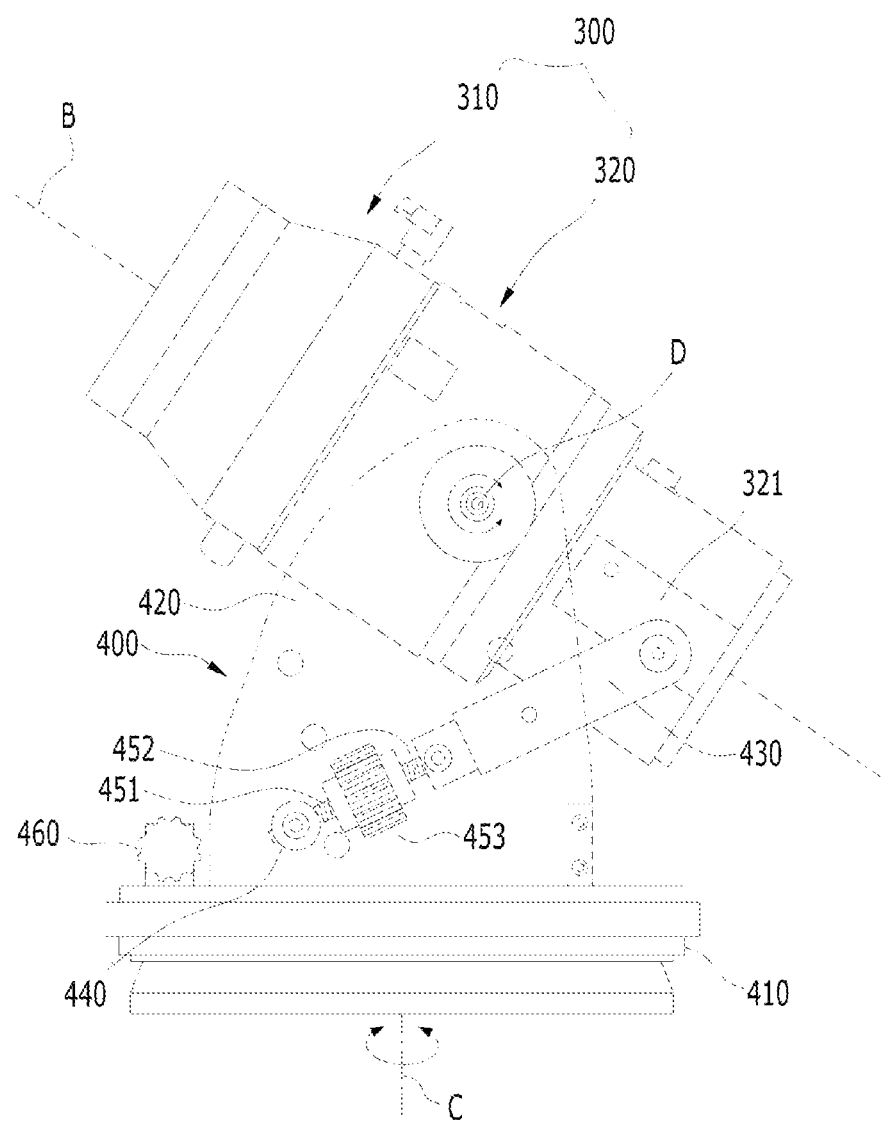

[Figure 5]
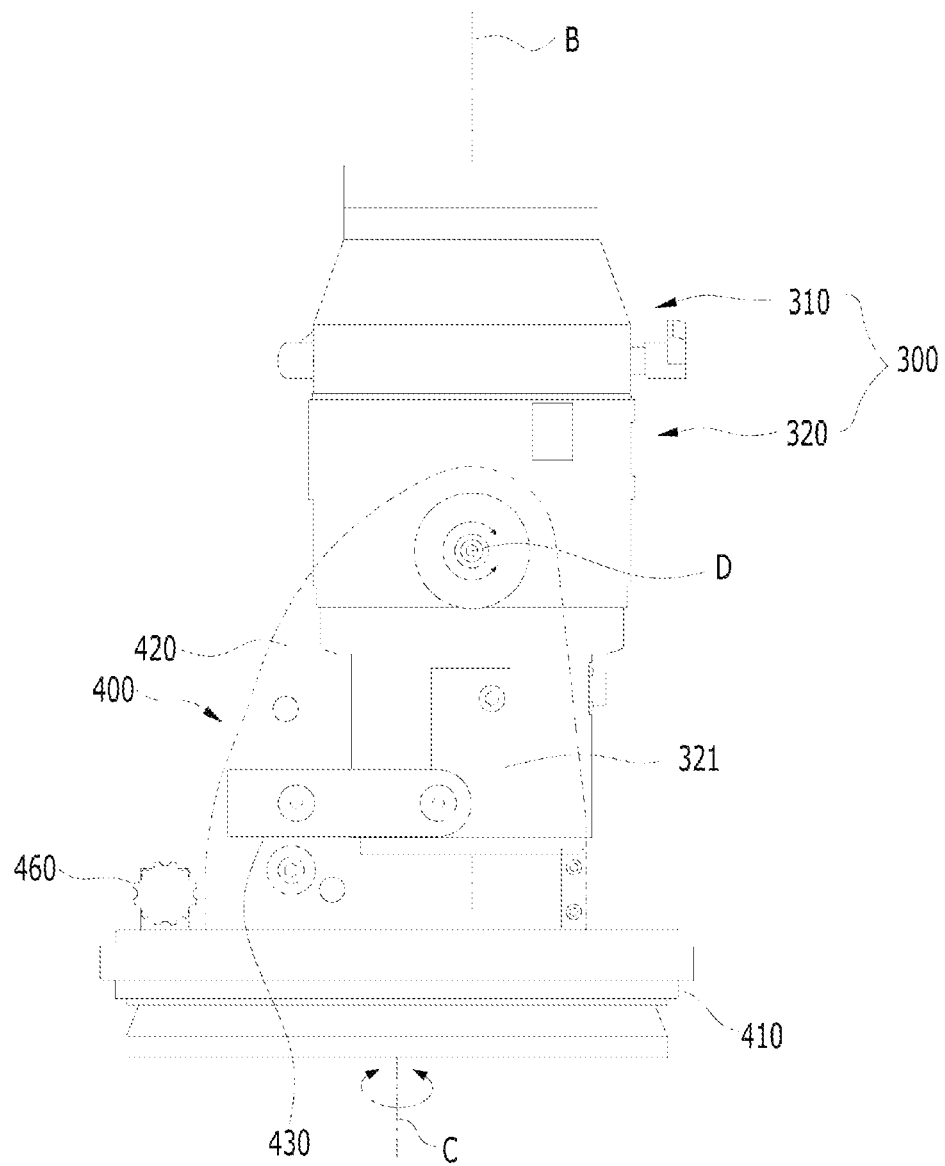

[Figure 6]
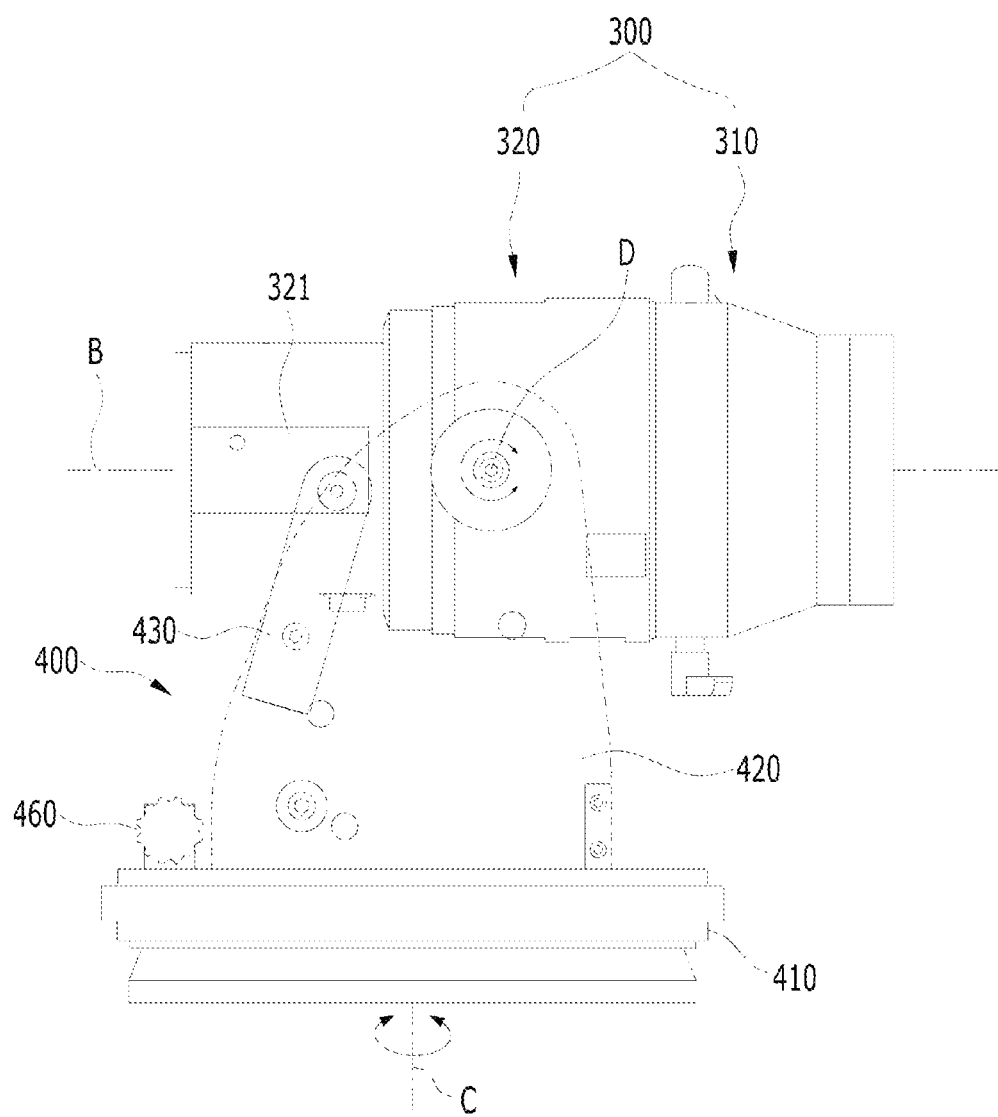

[Figure 7]
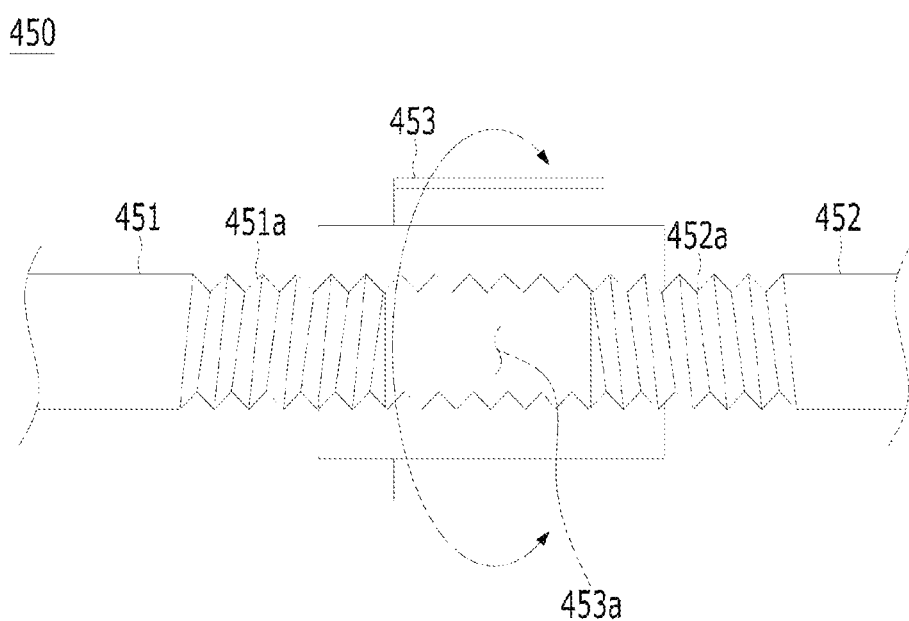

TRACKING DEVICE CAPABLE OF CHANGING TRACKING METHOD IN THREE TYPES

TECHNICAL FIELD

The present invention relates to a tracking device for tracking and observing or communicating with moving objects in space or in the atmosphere.

BACKGROUND ART

A telescope is a device that observes an object by receiving electromagnetic waves such as visible rays, infrared rays, ultraviolet rays, X-rays, and radio waves that are emitted or reflected from an object using optical devices such as lenses or mirrors. The telescope is classified into an optical telescope, a radio telescope, and the like according to the received electromagnetic waves, and generally, the telescope refers to an optical telescope that sees visible rays in many cases, and is used interchangeably with an optical tube. In the past, the telescope has been mainly used in astronomy, but recently, the range of use is increasing for military and communication purposes.

The telescope that tracks and observes moving objects in the sky or in space is installed on a mount, and the mount rotates by a driving signal to rotate the telescope installed thereon in a desired direction and then track the object. The mount is a mechanical tool that supports the telescope, and supports the weight of the telescope and allows a machine to be positioned accurately. According to a structural operation method, the mount is largely divided into an altitude-azimuth mount (ALT-AZ Mount) with a main axis vertical to the earth's surface and an equatorial mount with a main axis parallel to the earth's rotational axis.

Generally, the ALT-AZ mount is called a mount, which is an altazimuth mount type, but the ALT-AZ mount is a structure that determines an observation direction by rotating a main rotation shaft (azimuth axis) at 360° vertically to the ground and rotating a sub-rotation shaft (altitude axis) at 0° to 90° from the ground to the ceiling. The ALT-AZ mount has an advantage that the gravity acting on the telescope is constant and intuitive, but when tracking a celestial body, both axes need to move at the same time, and the rotation speed of each axis varies depending on the observation direction, so that a precise control is necessarily required. The ALT-AZ mount was mainly applied to large astronomical telescopes for research, but as a computer control became common, inexpensive small and medium-sized products appeared.

The equatorial mount has a structure in which the main rotation shaft (right ascension axis) is installed parallel to the Earth's rotational axis, and is advantageous for tracking and observing the celestial body while tracking the diurnal motion of stars. In other words, the equatorial mount is an appropriate method to continuously accumulate and collect images from the celestial body by rotating the main rotation shaft at the same speed as the Earth's rotation speed while the main rotation shaft is set to face the celestial north pole to track the celestial body. The equatorial mount is the most widely used tracking device which is mechanically simple and may observe the celestial body overnight and collect information. However, in the ALT-AZ mount and the equatorial mount, as all objects are closer to a point (the altazimuth mount is the ceiling and the equatorial is a pole on the celestial sphere) at which the main rotation shaft faces, an angle at which the actual rotation shaft needs to rotate rapidly increases as compared with an angular distance on the celestial sphere. A blind spot that was difficult to be observed occurred at such a point.

In a rather unfamiliar method, there is an altitude-altitude mount (ALT-ALT mount), in which the main rotation shaft of rotating the telescope is formed near the horizon. As a structure in which the main rotation shaft is parallel to the horizon, the sub-rotation shaft of rotating the entire structure is orthogonal to the main rotation shaft to observe the entire celestial sphere. However, in the existing ALT-ALT mount structure, the main rotation shaft of rotating the telescope and the sub-rotation shaft of rotating the entire device intersect each other, so that there is a problem that the periphery of the main rotation shaft and the sub-rotation shaft blocks the view of the telescope.

In order to solve this problem, in Korean Patent Publication No. 10-2085594, there is disclosed a "tracking device capable of omnidirectional observation without a blind zone". The tracking device of the present invention is basically the ALT-ALT mount, and while preventing blindness on the celestial sphere, the main rotation shaft and the sub-rotation shaft are located at different heights and do not intersect each other, so that there is an advantage of having no obstruction of the view due to the main rotation shaft. However, the installation structure of the ALT-AZ mount has a part which is difficult to exclude advantages of being easy to observe intuitive and non-linear objects and is particularly advantageous for tracking and observing celestial bodies moving in the same circumferential direction of the equatorial mount. In addition, depending on an object to be observed, these mounts may be more appropriate.

Therefore, the present inventors have studied a technology to implement the ALT-ALT mount in addition to the ALT-AZ mount and the equatorial mount in one tracking device.

DISCLOSURE

Technical Problem

The present invention is devised to satisfy the aforementioned needs, and an object of the present invention is to provide a tracking device of enabling a single mount to change a posture by any one of an altitude-azimuth (ALT-AZ) control method, an equatorial control method, and an altitude-altitude (ALT-ALT) control method so as to facilitate the best tracking according to the operation characteristics of a moving object on the celestial sphere by variously controlling an installation angle of a main rotation shaft.

Technical Solution

In order to achieve the aforementioned object, there is provided a tracking device capable of changing a tracking method in three types, including: an observation unit in which devices for receiving or transmitting images of an object are embedded; a first rotation unit provided with a first rotating body coupled to the other side of the observation unit so that one side of the observation unit is rotated based on a first rotation shaft and a first rotation fixture having an upper portion coupled to the first rotating body to rotate the first rotating body; a second rotation unit provided with a second rotating body coupled to a lower portion of the first rotation fixture and rotating along a second rotation shaft and a second rotation fixture formed to extend to the second rotating body to rotate the second rotating body; and a posture change unit provided with a fixing base installed based on a first posture change shaft facing the ceiling from the ground, and a second posture change shaft support so that the second rotation fixture is rotatable based on a second posture change shaft from the fixing base, wherein the posture change is enabled by any one of an altitude-azimuth (ALT-AZ) control method in which the second rotation shaft is parallel to the first posture change shaft, an equatorial control method in which the second rotation shaft is parallel to the earth's rotational axis, and an altitude-altitude (ALT-ALT) control method in which an angle of the second rotation shaft is orthogonal to the first posture change shaft.

The first rotation fixture may have a first attachment point formed at the center of a lower surface, and in the second rotation unit, the second rotating body may be coupled to the first attachment point so that the second rotation fixture may be connected with the second posture change shaft support to rotate at an angle of 0° to 90° along the second posture change shaft.

The first rotation fixture may have a second attachment point formed at the other lower surface, and in the second rotation unit, the second rotating body may be coupled to the second attachment point so that the second rotation fixture may form a right angle with the first posture change shaft.

The first rotation unit may include weights coupled to the lower surface of the first rotation fixture to compensate for the weight so that the second rotation shaft rotates, and the first rotation shaft and the second rotation shaft may not intersect each other to prevent a collision between the observation unit and the first rotation unit.

The second rotation fixture and the second posture change shaft support may have a plurality of fastening holes formed in predetermined points, and the posture change unit may include an angle controller linked and connected to the fastening holes of the second rotation fixture and the second posture change shaft support, respectively; an angle control fixture having both ends connected to the fastening holes of the second posture change shaft support; and an auxiliary angle controller connecting the angle controller and the angle control fixture and controlling the length, wherein an angle between the second rotation shaft and the first posture change shaft may be controlled according to the control length of the auxiliary angle controller, and the installation posture may be maintained by any one of the altitude-azimuth (ALT-AZ) control method, the equatorial control method, and the altitude-altitude (ALT-ALT) control method.

The auxiliary angle controller may include a first angle control rod which is formed in a long rod shape, and has a regular screw thread formed on an outer circumferential surface and one end connected to the angle controller; a second angle control rod which is formed in a long rod shape, and has a reverse screw thread formed on the outer peripheral surface to be symmetrical with the regular screw thread and the other end connected to the angle control fixture and disposed on the same line as the first angle control rod; and a connection control port which is disposed between the first angle control rod and the second angle control rod, and has an inner peripheral surface of one side formed to correspond to the regular screw thread and an inner peripheral surface of the other side formed to correspond to the reverse screw thread to connect the first angle control rod and the second angle control rod, wherein the rotation angle of the second rotation fixture may be determined from the fixing base by controlling the connection length of the first angle control rod and the second angle control rod along a rotation direction of the connection control port.

Advantageous Effects

According to the present invention, it is possible to facilitate tracking according to the operation characteristics of a moving object on the celestial sphere by changing a posture by an altitude-azimuth (ALT-AZ) control method in which the second rotation shaft is disposed in parallel to the first posture change shaft, an equatorial control method in which the second rotation shaft is disposed in parallel to the earth's rotational axis, and an altitude-altitude (ALT-ALT) control method in which the second rotation shaft is disposed orthogonally to the first posture change shaft, by controlling the installation angle of the second rotation shaft.

In addition, the observation unit may continuously receive images of the object while tracking the moved or moving object by rotating based on the first rotation shaft, and the observation unit is stably rotated and supported without being biased by the coupling structure of the first rotation unit, the second rotation unit, and the posture change unit, thereby improving the structural stability of the observation unit.

In addition, while the second rotation unit is coupled to the second attachment point of the first rotation unit, in order to track the object, the second rotation shaft is rotated and fixed to form a right angle with the first posture change shaft so that the first rotation shaft and the second rotation shaft do not intersect each other, thereby preventing the observation unit from colliding with the second rotation unit while rotating.

In addition, the plurality of coupling holes are formed in both side ends of the second rotation fixture and a predetermined point of the second posture change shaft support, and the second rotation shaft and the first posture change shaft are screwed and fixed to the coupling holes of the second rotation fixture and the second posture change shaft support to form an angle of 0° to 90°, thereby easily and simply changing the control method.

In addition, the installation posture is changed by controlling the inclination angle between the second rotation shaft and the first posture change shaft according to the length control of the auxiliary angle controller, thereby simply and easily changing the control method and improving the convenience of the user.

In addition, the fixing base is installed in connection with the posture change angle controller so as to accurately rotate toward the north side based on the first posture change shaft to precisely rotate at an accurate point to be observed.

DESCRIPTION OF DRAWINGS

FIG. 1 is a perspective view of a tracking device capable of changing a tracking method in three types according to an exemplary embodiment of the present invention.

FIG. 2 is a side view of a tracking device capable of changing a tracking method in three types according to another exemplary embodiment of the present invention.

FIG. 3 is a front perspective view of a second rotation unit and a posture change unit illustrated in FIG. 1.

FIG. 4 is a side view illustrating an equatorial control method of the tracking device according to the present invention.

FIG. 5 is a side view illustrating an altitude-azimuth (ALT-AZ) control method of the tracking device according to the present invention.

FIG. 6 is a side view illustrating an altitude-altitude (ALT-ALT) control method of the tracking device according to the present invention.

FIG. 7 is a detailed configuration diagram of an auxiliary angle controller of the present invention.

BEST MODE

Hereinafter, exemplary embodiments of the present invention will be described in detail with reference to the accompanying drawings. Exemplary embodiments to be described below relate to a tracking device capable of tracking and observing or communicating with moving objects in space or in the atmosphere. Hereinafter, a tracking device capable of changing a tracking method in three types will be briefly abbreviated as a 'tracking device'.

With respect to upper, lower, left and right directions of the tracking device of the exemplary embodiment of the present invention, the exemplary embodiment of the present invention will be described by defining a left direction as 'one side' and a right direction as 'the other side' based on the sides of the tracking device illustrated in FIG. 2 and defining a ground direction as a 'lower direction' and an opposite direction as an 'upper direction'. This is for the purpose of explaining the present invention so as to be clearly understood to the extent, and it goes without saying that each direction may be defined differently depending on a reference point.

FIG. 1 is a perspective view of a tracking device capable of changing a tracking method in three types according to an exemplary embodiment of the present invention and FIG. 2 is a side view of a tracking device capable of changing a tracking method in three types according to another exemplary embodiment of the present invention.

Referring to FIGS. 1 and 2, the tracking device of the present invention is capable of observing or communicating with a moving celestial body or a flying object such as a drone in space or in the atmosphere, and includes configurations of an observation unit 100, a first rotation unit 200, a second rotation unit 300, and a posture change unit 400. The tracking device of the present invention having such a configuration may change a tracking method according to a rotation angle of a first rotation shaft by changing a coupling structure of the first rotation unit 200 and the second rotation unit 300 according to the operation characteristics of an object to be observed The observation unit 100 means a configuration in which devices for receiving or transmitting images of an object or images of light emitted or reflected are embedded. The observation unit 100 is a term that collectively refers to a configuration for detecting optical data, and may be a telescope barrel for receiving visible rays, an antenna for receiving external radio waves, and a laser receiver for receiving a laser transmitted from a satellite according to the type of optical data. As illustrated in FIG. 1, the observation unit 100 receives images of the object from one end, and tracks a moved or moving object while one end of the observation unit 100 is rotated based on the first rotation unit 200 to be described below to continuously receive the images of the object.

The first rotation unit 200 is configured to rotate the observation unit 100 at a predetermined angle, and is coupled to the lower portion of the observation unit 100 so that the observation unit 100 is rotated based on a second rotation shaft coupled to the first rotation unit 200. In addition, the first rotation unit 200 may increase a rotation radius by controlling the coupling position of the observation unit 100 in order to control an observation distance according to the object. The first rotation unit 200 may include a configuration of a first rotating body 210 and a first rotation fixture 220.

In detail, the first rotating body 210 has an elongated circular bar shape and may be coupled to the other end of the observation unit 100 so that the observation unit 100 is rotated based on a first rotation shaft A. Here, the first rotating body 210 has the same axial direction as the first rotation shaft A, and is formed to protrude from both sides of the other end of the observation unit 100 to provide an installation space to be coupled with the first rotation fixture 220. At this time, it is preferred that the first rotating body 210 is formed with a predetermined diameter in consideration of a thickness of the first rotation fixture 220 designed to support the load of the observation unit 100.

The first rotation fixture 220 is a configuration in which a device for rotating the first rotating body 210 is embedded, and may be formed of an iron frame considered so as to be coupled to the first rotating body 210 to support the load of the observation unit 100. Here, the first rotation fixture 220 is provided in connection with a power device for implementing the rotating operation of the first rotating body 210 therein. In particular, the first rotation fixture 220 may be formed in a 'U' shape, and both upper ends are connected to be symmetrical on both sides of the first rotating body 210 to have a structure in which the observation unit 100 may be stably rotated at high speed.

In addition, the first rotation fixture 220 may be formed in a cantilever shape, and is preferably designed in consideration of the size and thickness of the iron frame so as to be connected to one side of the first rotating body 210 to withstand the load of the observation unit 100. In addition, the first rotation fixture 220 is provided so that a lower end thereof is coupled to be spaced apart from the other end of the observation unit 100 by the shape and the structure, and the other end of the observation unit 100 may be rotated inside the first rotation fixture 220.

In addition, the first rotation unit 200 may be coupled so that a second rotation unit 300 to be described below is separable from a lower end or a lower side of the first rotation fixture 220, and is provided with a coupling space at a lower central position so as to be stably rotated by the second rotation unit 300. Such a first rotation unit 200 may change a coupling position of the first rotating body 210 according to an object as illustrated in FIG. 1 or 2 to change a tracking method and extend an observation range. FIG. 1 may be mainly used for an equatorial control method or an altitude-azimuth (ALT-AZ) control method, and FIG. 2 may be suitably used for an altitude-altitude (ALT-ALT) control method.

As illustrated in FIG. 1, when the second rotation unit 300 is coupled to a first attachment point 220a of the lower end of the first rotation unit 200, the first rotation fixture 220 is rotated at 360° based on a second rotation shaft B so that the observation radius of the observation unit 100 may be extended in a pole direction. At this time, the second rotation unit 300 and the second rotation shaft B have the same axial direction, and the first rotation fixture 220 and the second rotation unit 300 are coupled to each other so that the observation unit 100 may be stably rotated inside the first rotation fixture 220.

As illustrated in FIG. 2, when the second rotation unit 300 is coupled to a second attachment point 220b of the lower end of the first rotation unit 200, the first rotation fixture 220 is rotated at 360° vertically to the second rotation shaft B so that the observation radius of the observation unit 100 may be extended in an equatorial direction. At this time, the first rotation shaft A and the second rotation shaft B do not intersect each other, so that the observation unit 100 does not collide with the second rotation unit 300.

Meanwhile, in FIG. 2, the first rotation fixture 220 is connected to the other end of the observation unit 100 while standing vertically from the ground to be biased toward one end by the load of the observation unit 100. As a result, shaking occurs when the observation unit 100 or the first rotation fixture 220 rotates, so that the images received by the observation unit 100 are blurred or unclear, and the coupling portion of the first rotation fixture 220 and the second rotation unit 300 may be damaged.

Accordingly, the first rotation fixture 220 is provided with a connecting bar vertically connected to the lower surface thereof symmetrically to both sides, and a plurality of weights 230 may be mounted at the lower end of the connecting bar. The weights 230 allow the load of the observation unit 100 to be uniformly distributed to the observation unit 100 and the weights 230, thereby improving the structural safety of the tracking device. According to this principle, as the size or load of the observation unit 100 increases, the weight of the weights 230 increases, so that the weights 230 are proportional to the size or load of the observation unit 100.

The second rotation unit 300 is configured to determine the tracking method according to a change in angle of the second rotation shaft B, and enables the posture change by any one of the altitude-azimuth (ALT-AZ) control method, the equatorial control method, and the altitude-altitude (ALT-ALT) control method. That is, the second rotation unit 300 is coupled to the lower portion of the first rotation unit 200 based on the second rotation shaft B, and rotates the first rotation fixture 220 at an angle of 360° at the coupled position to increase the tracking radius. Such a second rotation unit 300 may include a configuration of a second rotating body 310 and a second rotation fixture 320.

In detail, the second rotating body 310 has a cylindrical shape, and may be coupled to the lower surface or the lower side of the first rotation fixture 220 so that the first rotation fixture 220 is rotated based on the second rotation shaft B. Here, the second rotating body 310 has a structure in which the axial direction coincides with the second rotation shaft B, and one end is coupled to the first rotation fixture 220 to pivotally rotate toward the second rotation shaft B. At this time, the second rotating body 310 preferably considers the diameter of the shaft coupled so as not to be damaged by the load of the observation unit 100 and the first rotation unit 200 at a point coupled with the first rotation fixture 220.

The second rotation fixture 320 is a configuration in which a device for rotating the second rotating body 310 is embedded, and extends to the other side of the second rotating body 310 to support the load of the observation unit 100 and the first rotation unit 200. At this time, the second rotation fixture 320 is formed at one side so that a second posture change shaft D connected to the posture change unit 400 intersects the second rotation shaft B in a direction parallel to the ground. In addition, the second rotation fixture 320 has a structure that is rotated based on the second posture change shaft D connected to the posture change unit 400.

In addition, the second rotation fixture 320 is disposed at both ends of the other side, and may include an angle control bracket 321 in which a plurality of fastening holes are formed. The angle control bracket 321 is formed of a square plate, and is symmetrically installed on both sides of the second rotation fixture 320 in a vertical direction to the ground. At this time, the angle control bracket 321 may have fastening holes formed in one upper side and the other lower side, and may be connected to the posture change unit 400 by a link through the fastening holes to change or fix the angle of the second rotation shaft B.

The altitude-azimuth (ALT-AZ) control method, the equatorial control method, and the altitude-altitude (ALT-ALT) control method in which the second rotation unit 300 is changed according to an angle change of the second rotation shaft B will be described as follows.

First, the equatorial control method has a structure in which the second rotation shaft B is provided in parallel to the earth's rotational axis. The equatorial control method is a tracking method most widely used for an astronomical observation by bending up the second rotation shaft B as much as an observer's altitude while facing a true north and rotating only the first rotation shaft A to track the object. In order to implement this, the object may be tracked and observed by controlling the angle of the second rotation shaft B using the posture change unit 400.

In addition, the altitude-azimuth (ALT-AZ) control method has a structure in which the second rotation shaft B is provided vertically to the surface of the earth. The altitude-azimuth (ALT-AZ) control method is a tracking method capable of determining an observation direction by rotating the second rotation shaft B vertically to the ground at 360° and rotating the observation unit 100 between the ground and the ceiling. In general, when the celestial body is observed, the first rotation shaft A and the second rotation shaft B need to be operated simultaneously by axial rotation, and the rotation speeds of the first rotation shaft A and the second rotation shaft B may be controlled according to the observation direction by a computer.

In addition, the altitude-altitude (ALT-ALT) control method has a structure in which the second rotation shaft B is provided in parallel to the surface of the earth. The altitude-altitude (ALT-ALT) control method is a tracking method in which the second rotation shaft B and the first rotation shaft A are located at different heights not to intersect each other and there is no obstruction of the view due to the second rotation shaft B.

FIG. 3 is a front perspective view of a second rotation unit and a posture change unit illustrated in FIG. 1, FIG. 4 is a side view illustrating an equatorial control method of the tracking device according to the present invention, FIG. 5 is a side view illustrating an altitude-azimuth (ALT-AZ) control method of the tracking device according to the present invention, and FIG. 6 is a side view illustrating an altitude-altitude (ALT-ALT) control method of the tracking device according to the present invention.

The posture change unit 400 is configured to change and fix the installation posture of the second rotation unit 300 at various angles, and is coupled to be rotated based on the second posture change shaft D. Here, the posture change unit 400 may be changed by a suitable measurement method according to an object by allowing the second rotation unit 300 to rotate at a predetermined angle to the inside of the posture change unit 400 or to fix the installation posture to the angle control bracket 321.

Referring to FIGS. 3 to 6, the posture change unit 400 may include a fixing base 410, a second posture change shaft support 420, an angle controller 430, an angle control fixture 440, an auxiliary angle controller 450, and a posture change angle controller 460.

The fixing base 410 is located at the lower portion of the posture change unit 400, and is disposed vertically to the ground to be installed to face the ceiling. In addition, the fixing base 410 provides a space so that an upper surface is formed horizontally to install other components, and has a structure in which an axial direction thereof is disposed to coincide with a first posture change shaft C to be rotated based on the first posture change shaft C. The fixing base 410 is rotatable at an angle of 360° in the axial direction of the first posture change shaft C, and is installed in connection with a control device at the lower portion to control the rotation angle.

The second posture change shaft support 420 is configured to be installed on the fixing base 410 so that the second rotation unit 300 is rotatable based on the second posture change shaft D. This second posture change shaft support 420 is formed of two flat plates, and is symmetrically disposed on both sides of the second rotation fixture 320 and vertically erected and fixed to the fixing base 410. At this time, the second posture change shaft support 420 has a through hole formed in the upper portion, and one side of the second rotation fixture 320 disposed between the two second posture change shaft supports 420 is connected and coupled to the through hole by the second posture change shaft D.

In addition, the second posture change shaft support 420 has a plurality of fastening holes formed in the lower portion of the through hole so that the second rotation unit 300 may be fixed at a predetermined angle. In particular, the second posture change shaft support 420 may have a fastening hole formed in a position capable of fixing the installation posture by an altitude-azimuth (ALT-AZ) control method in which the second rotation shaft B is parallel to the first posture change shaft C and an altitude-altitude (ALT-ALT) control method in which the second rotation shaft B is orthogonal to the first posture change shaft C. In addition, the second posture change shaft support 420 may be fixed to the fastening hole by the equatorial control method in which the second rotation unit 300 is fixed to observe the object with the observation unit 100 while the second rotation shaft B is parallel to the earth's rotational axis.

The angle controller 430 is configured to rotate the second rotation unit 300 at a predetermined angle according to the operation or to be fixedly coupled to the fastening holes of the second posture change shaft support 420. The angle controller 430 has a lower portion formed in a horizontal bar shape and is disposed to be spaced apart from the other end of the second rotation unit 300 so that the second rotation unit 300 is rotatably formed inward. In addition, the angle controller 430 has both ends of the horizontal bar formed to be bent upward and is coupled to any one selected from the plurality of fastening holes of the angle control bracket 321. At this time, the angle controller 430 may fix the second rotation unit 300 by coupling both lower sides to the fastening holes of the second posture change shaft support 420.

The angle control fixture 440 is formed in a rod shape, and both ends are horizontally connected to the fastening holes formed in the lower portion of one side of the second posture change shaft support 420. At this time, the angle control fixture 440 is formed to correspond to an interval between the two second posture change shaft supports 420, so that it is preferable to be provided to be fixed to or separated from the second posture change shaft support 420. The angle control fixture 440 may be easily coupled or separated according to the control method of the second rotation unit 300 by the coupling and separating structure.

The auxiliary angle controller 450 is configured to control a distance between the angle controller 430 and the angle control fixture 440, and operated so that the second rotation unit 300 may be changed at a predetermined angle by pulling or pushing the lower portion of the angle controller 430. As such, the auxiliary angle controller 450 has one end connected to a lower center of the angle controller 430 and the other end connected to the center of the angle control fixture 440. At this time, while the distance between the angle controller 430 and the angle control fixture 440 is changed according to a length change, the auxiliary angle controller 450 may control the rotation angle of the second rotation unit 300.

FIG. 7 is a detailed configuration diagram of the auxiliary angle controller of the present invention. Referring to FIG. 7, the auxiliary angle controller 450 may include a first angle control rod 451, a second angle control rod 452, and a connection control port 453. In the auxiliary angle controller 450, the lengths of the first length control rod 451 and the second length control rod 452 are controlled while the connection control port 453 is rotated by the user.

The first angle control rod 451 is formed in a long rod shape, a regular screw thread 451*a* is formed on an outer circumferential surface, and one end is connected to the lower center of the angle controller 430. At this time, a coupling port connected to the first angle control rod 451 may be formed on the lower surface of the angle controller 430 and provided so as to be coupled and separated.

The second angle control rod 452 is formed in a long rod shape, a second screw thread 462*a* is formed on the outer peripheral surface to be symmetrical with the regular screw thread 451*a*, and the other end is connected to the center of the angle control fixture 440 and disposed on the same line as the first angle control rod 451. Here, the second angle control rod 452 is provided to be coupled to and separable from the angle control fixture 440, and a groove may be formed in the angle control fixture 440 so as to be stably fixed to the end by a fixing member.

The connection control port 453 is disposed between the first angle control rod 451 and the second angle control rod 452, and an inner peripheral surface of one side is formed to correspond to the regular screw thread 451*a* and an inner peripheral surface of the other side is formed to correspond to the second screw thread 462*a* to connect the first angle control rod 451 and the second angle control rod 452. The connection control port 453 may extend or reduce the connection length of the first angle control rod 451 and the second angle control rod 452 according to a rotation direction. Accordingly, the connection control port 453 may control the rotation angle of the second rotation unit 300 by controlling the lengths of the first angle control rod 451 and the second angle control rod 452 by implementing a simple operation.

In addition, the connection control port 453 may be formed therein with a screw thread free space 453*a* through which the first angle control rod 451 and the second angle control rod 452 are inserted and penetrated. It is preferable that one side of the screw thread free space 453*a* is formed to correspond to the regular screw thread 451*a*, and the other side is formed to correspond to the reverse screw thread 452*a*. By this configuration, the auxiliary angle controller 450 becomes a minimum length when the ends of the first angle control rod 451 and the second angle control rod 452 come into contact with each other, and becomes a maximum length when the ends of the first angle control rod 451 and the second angle control rod 452 are hold by 1 to 2 pitches.

Referring to FIGS. 4 to 6, three types of control methods of the equatorial control method, the altitude-azimuth (ALT-AZ) control method, and the altitude-altitude (ALT-ALT) control method of the tracking device will be described. As illustrated in FIG. 4, the equatorial control method is provided so that the observation unit 100 rotates while the second rotation shaft B is parallel to the earth's rotational axis to track the object. In order to implement the equatorial control method, the object may be tracked and observed by controlling the angle of the first rotation shaft A using the posture change unit 400.

At this time, both ends of the auxiliary angle controller 450 are connected to the angle controller 430 and the angle control fixture 440, respectively, and the second rotation unit 300 is rotated while the length of the auxiliary angle controller 450 is extended or contracted. Here, the angle control fixture 440 is coupled to the lower end of one side of the angle control bracket 321 so that the other ends of the auxiliary angle controller 450 and the angle controller 430 are located in an upwardly inclined posture, and has a triangle structure with the second rotation unit 300 to hold the center of gravity of the tracking device, thereby preventing a phenomenon that the load of the observation unit 100 is unbalanced. As such, it is possible to minimize the size of the second rotation unit 300 by the connection structure and arrangement structure of the second rotation unit 300 and the posture change unit 400.

The posture change angle controller 470 precisely controls the rotation angle of the fixing base 410, and finely controls the fixing base 410 to face a north side by both-side control ports. Such a posture change angle controller 470 may be connected to the first posture change shaft C of the fixing base 410 and adjusted by an observer.

As illustrated in FIG. 5, the altitude-azimuth (ALT-AZ) control method is provided to track the object by rotating the first rotation shaft A while the second rotation shaft B is parallel to the first posture change shaft C. That is, the altitude-azimuth (ALT-AZ) control method is a tracking method capable of determining an observation direction by rotating the second rotation shaft B vertically to the ground at 360° and rotating the observation unit 100 between the ground and the ceiling. When the celestial body is observed by the altitude-azimuth (ALT-AZ) control method, the first rotation shaft A and the second rotation shaft B are operated simultaneously, and the rotation speeds of the first rotation shaft A and the second rotation shaft B may be controlled according to the observation direction, respectively, to observe the celestial body.

At this time, the second rotation unit 300 is connected to the other end of the angle control bracket 321 so that both ends of the angle controller 430 form a right angle so that one end may be fixed upwards and the other end may be fixed downwards. In addition, the angle controller 430 is coupled with a fastening member 401 through the fastening hole formed in the lower portion of the angle controller 430 and the fastening hole of the fixing bracket 400 formed in the upper portion of the angle control fixture 440 so as to be fixed to the fixing bracket 400 at a position forming a right angle with the angle control bracket 321. Here, the angle controller 430 has a right-angled triangular structure in which the second rotation unit 300 and the other end form a right angle, so that the second rotation unit 300 is stably erected vertically from the ground.

As illustrated in FIG. 6, the altitude-altitude (ALT-ALT) control method is provided to track the object by rotating the first rotation shaft A while the second rotation shaft B is orthogonal to the first posture change shaft C. The altitude-altitude (ALT-ALT) control method is a tracking method in which the second rotation shaft B and the first rotation shaft A are located at different heights not to intersect each other and there is no obstruction of the view due to the second rotation shaft B.

At this time, the second rotation unit 300 is connected to the other end of the angle control bracket 321 so that both ends of the angle controller 430 form a predetermined angle so that one end may be fixed in the other direction and the other end may be fixed in one direction. Here, the second rotation unit 300 may maintain the balance of the tracking device by mounting the connecting bar connected downwardly to the middle portion and the weights 230 at the lower end so as to stably support the observation unit 100. Such a second rotation unit 300 may uniformly distribute the load of the tracking device to both sides, and the second rotation unit 300 is maintained in parallel to the ground.

As described above, the basic technical spirit of the present invention is to provide the tracking device capable of allowing one mount to change the tracking method to any one of the three types of the altitude-azimuth (ALT-AZ) control method, the equatorial control method, and the altitude-altitude (ALT-ALT) control method by controlling variously the installation angle of the main rotation shaft to facilitate the best tracking according to the operation characteristics of the moving object on the celestial sphere.

Various modifications are possible by those skilled in the art within the scope of the basic technical spirit of the present invention, and therefore, the scope of the present invention should be appreciated within the appended claims written to include various modifications.

The invention claimed is:

1. A tracking device, comprising:
   an observation unit (100) in which devices for receiving or transmitting images of an object are embedded;
   a first rotation unit (200) provided with a first rotating body (210) coupled to the other side of the observation unit (100) so that one side of the observation unit (100) is rotated based on a first rotation shaft (A) and a first rotation fixture (220) having an upper portion coupled to the first rotating body (210) to rotate the first rotating body (210);
   a second rotation unit (300) provided with a second rotating body (310) coupled to a lower portion of the first rotation fixture (220) and rotating along a second rotation shaft (B) and a second rotation fixture (320) formed to extend to the second rotating body (310) to rotate the second rotating body (310); and
   a posture change unit (400) provided with a fixing base (410) installed based on a first posture change shaft (C) facing the ceiling from the ground, and a second posture change shaft support (420) so that the second rotation fixture (320) is rotatable based on a second posture change shaft (D) from the fixing base (410),
   wherein the posture change is enabled by any one of an altitude-azimuth (ALT-AZ) control method in which the second rotation shaft (B) is parallel to the first posture change shaft (C), an equatorial control method in which the second rotation shaft (B) is parallel to the earth's rotational axis, and an altitude-altitude (ALT-ALT) control method in which an angle of the second rotation shaft (B) is orthogonal to the first posture change shaft (C).

2. The tracking device of claim 1, wherein the first rotation fixture (220) has a first attachment point (220a) formed at the center of a lower surface, and
   in the second rotation unit (300), the second rotating body (310) is coupled to the first attachment point (220a) so that the second rotation fixture (320) is connected with the second posture change shaft support (420) to rotate at an angle of 0° to 90° along the second posture change shaft (D).

3. The tracking device of claim 1, wherein the first rotation fixture (220) has a second attachment point (220b) formed at the other lower surface, and in the second rotation unit (300), the second rotating body (310) is coupled to the second attachment point (220b) so that the second rotation fixture (320) forms a right angle with the first posture change shaft (C).

4. The tracking device of claim 3, wherein the first rotation unit (200) includes weights (230) coupled to the lower surface of the first rotation fixture (220) to compensate for the weight so that the second rotation shaft (B) rotates, and the first rotation shaft (A) and the second rotation shaft (B) do not intersect each other to prevent a collision between the observation unit (100) and the first rotation unit (200).

5. The tracking device of claim 1, wherein the second rotation fixture (320) and the second posture change shaft support (420) have a plurality of fastening holes formed in predetermined points, and the posture change unit (400) includes an angle controller (430) linked and connected to the fastening holes of the second rotation fixture (320) and the second posture change shaft support (420), respectively;

an angle control fixture (440) having both ends connected to the fastening holes of the second posture change shaft support (420); and an auxiliary angle controller (450) connecting the angle controller (430) and the angle control fixture (440) and controlling the length, wherein an angle between the second rotation shaft (B) and the first posture change shaft (C) is controlled according to the control length of the auxiliary angle controller (450), and the installation posture is maintained by any one of the altitude-azimuth (ALT-AZ) control method, the equatorial control method, and the altitude-altitude (ALT-ALT) control method.

6. The tracking device of claim 5, wherein the auxiliary angle controller (450) includes a first angle control rod (451) which is formed in a long rod shape, and has a regular screw thread (451a) formed on an outer circumferential surface and one end connected to the angle controller (430);

a second angle control rod (452) which is formed in a long rod shape, and has a reverse screw thread (452a) formed on the outer peripheral surface to be symmetrical with the regular screw thread (451a) and the other end connected to the angle control fixture (440) and disposed on the same line as the first angle control rod (451); and a connection control port (453) which is disposed between the first angle control rod (451) and the second angle control rod (452), and has an inner peripheral surface of one side formed to correspond to the regular screw thread (451a) and an inner peripheral surface of the other side formed to correspond to the reverse screw thread (452a) to connect the first angle control rod (451) and the second angle control rod (452), wherein the rotation angle of the second rotation fixture (320) is determined from the fixing base (410) by controlling the connection length of the first angle control rod (451) and the second angle control rod (452) along a rotation direction of the connection control port (453).

\* \* \* \* \*